US006920504B2

(12) United States Patent
Bender et al.

(10) Patent No.: US 6,920,504 B2
(45) Date of Patent: Jul. 19, 2005

(54) METHOD AND APPARATUS FOR CONTROLLING FLOW OF DATA IN A COMMUNICATION SYSTEM

(75) Inventors: Paul E. Bender, San Diego, CA (US); Peter J. Black, San Diego, CA (US); Matthew S. Grob, La Jolla, CA (US); Ramin Rezaiifar, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 395 days.

(21) Appl. No.: 10/144,973

(22) Filed: May 13, 2002

(65) Prior Publication Data

US 2003/0212816 A1 Nov. 13, 2003

(51) Int. Cl.[7] .............................................. G06F 15/16
(52) U.S. Cl. ....................... 709/232; 709/224; 709/229; 370/231; 370/331; 713/201
(58) Field of Search ................................ 709/224, 229, 709/232; 713/201; 370/231, 331

(56) References Cited

U.S. PATENT DOCUMENTS 6,400,724 B1 * 6/2002 Yao ............................ 370/429
6,587,684 B1 * 7/2003 Hsu et al. .................... 455/419
6,647,001 B1 * 11/2003 Bhagavath et al. .......... 370/331
6,731,647 B2 * 5/2004 Yao ............................ 370/429
2002/0031088 A1 * 3/2002 Packer ........................ 370/231

FOREIGN PATENT DOCUMENTS

WO         01/17157 A1     3/2001

* cited by examiner

*Primary Examiner*—Hosain Alam
*Assistant Examiner*—Liang-che Alex Wang
(74) *Attorney, Agent, or Firm*—Philip Wadsworth; Sandra L. Godsey; S. Hossain Beladi (57) ABSTRACT

A control system (900, 1100) and various methods and apparatus for efficient communications of data across various protocol layers are disclosed. Generally, various aspects of the invention provide for efficient use of communication resources in a communication system (100) by efficiently controlling delay of a TCP acknowledgment message of reception of data from one communication protocol layer to another. Moreover, the delay of the TCP acknowledgment message and the message may be controlled to effect an efficient and consistent flow of data from a source end to a destination end, in particular, in case of encrypted communications.

23 Claims, 10 Drawing Sheets

METHOD AND APPARATUS FOR CONTROLLING FLOW OF DATA IN A COMMUNICATION SYSTEM

FIELD

The present invention relates generally to the field of communications, and more particularly, to data communications in a communication system.

BACKGROUND

In a communication system, unnecessary and excessive transmission by a user may cause interference for other users in addition to reducing the system capacity. The unnecessary and excessive transmission may be caused by inefficient flow of data in the communication system. The data communicated between two end users may pass through several layers of protocols for assuring proper flow of data through the system. The proper delivery of data in at least one aspect is assured through a system of checking for error in each packet of data, and requesting a retransmission of the same packet of data if an unacceptable error is detected in the packet of data. Passing data from one protocol layer to another may be performed for a group of data packets at a time. Passing a group of data packets from one protocol layer to another may not take place until the process for retransmission of the selected packets of data in the group in the lower protocol layer has been completed. As a result, the retransmission process at one protocol layer may slow down flow of data between different protocol layers in the system. In addition, the higher layer of protocol may request for retransmission of all the packets of data in the group, resulting in a very inefficient use of communication resources when flow of data from one protocol layer to another is slowing or changing from fast to slow in a rapid succession.

To this end as well as others, there is a need for a method and apparatus to efficiently control flow of data in a communication system.

SUMMARY

A system and various methods and apparatus for efficient communications of data across various protocol layers are disclosed. Generally, various aspects of the invention provide for efficient use of communication resources in a communication system by efficiently controlling delay of an acknowledgment message of reception of data from one communication protocol layer to another. Moreover, the delay of the acknowledgment message and the message may be controlled to effect an efficient and consistent flow of data from a source end to a destination end, in particular, in case of encrypted communications.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT(S)

Generally stated, a novel and improved method and apparatus provide for efficient use of communication resources in a communication system by efficiently controlling delay of an acknowledgment message of reception of data from one communication protocol layer to another. Moreover, the delay of the acknowledgment message and the message may be controlled to effect an efficient and consistent flow of data from a source end to a destination end. In particular, in case of encrypted communications, the delay of both the acknowledgment message and the message may be controlled. One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

More specifically, various embodiments of the invention may be incorporated in a wireless communication system operating in accordance with the code division multiple access (CDMA) technique which has been disclosed and described in various standards published by the Telecommunication Industry Association (TIA) and other standards organizations. Such standards include the TIA/EIA-95 standard, TIA/EIA-IS-2000 standard, IMT-2000 standard, UMTS and WCDMA standard, all incorporated by reference herein. A system for communication of data is also detailed in the "TIA/EIA/IS-856 cdma2000 High Rate Packet Data Air Interface Specification," incorporated by reference herein. A copy of the standards may be obtained by accessing the world wide web at the address: http://www.3gpp2.org, or by writing to TIA, Standards and Technology Department, 2500 Wilson Boulevard, Arlington, Va. 22201, United States of America. The standard generally identified as UMTS standard, incorporated by reference herein, may be obtained by contacting 3GPP Support Office, 650 Route des Lucioles-Sophia Antipolis, Valbonne-France.

Figure 1:
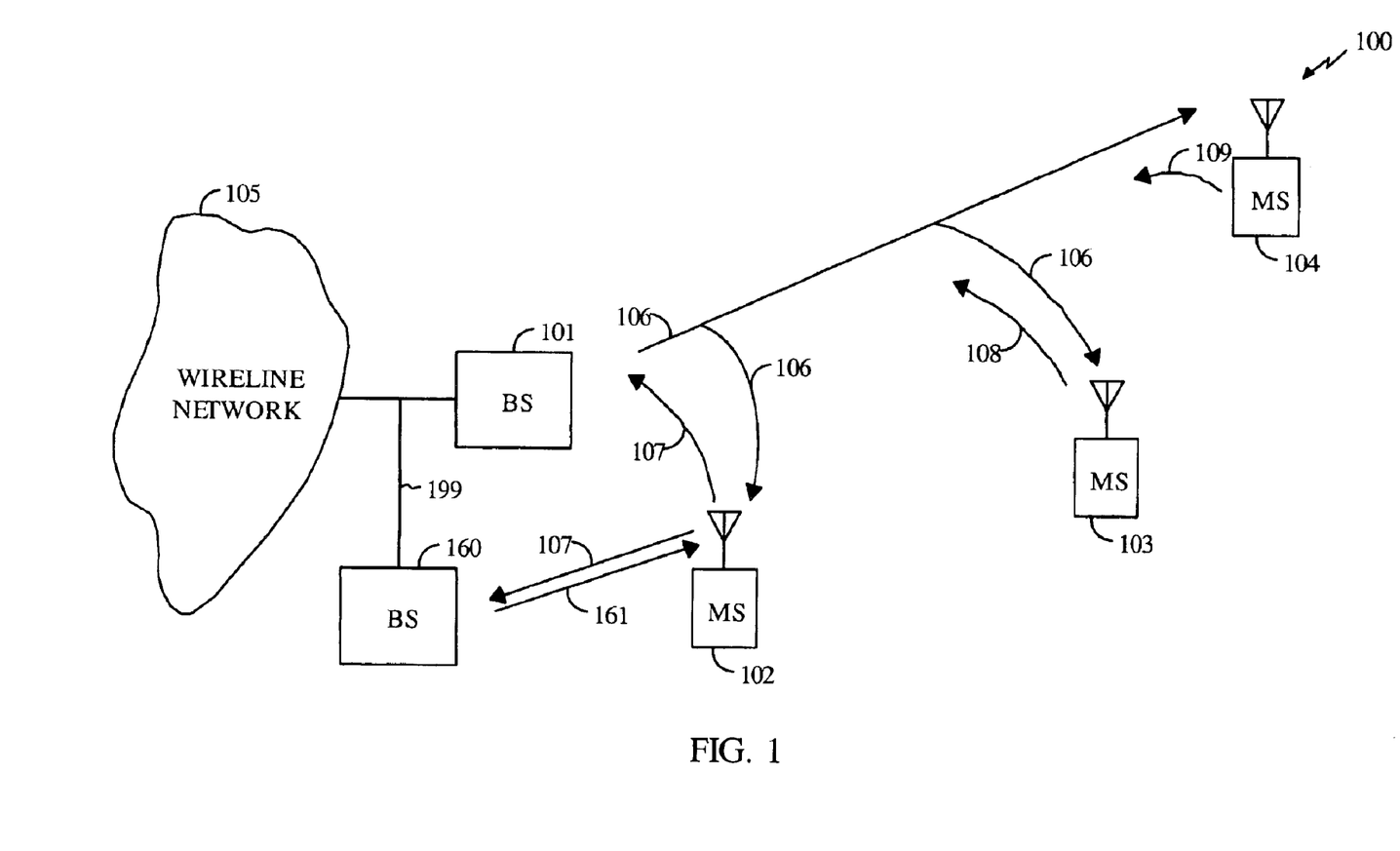
FIG. 1 illustrates a communication system capable of operating in accordance with various embodiments of the invention.

FIG. 1 illustrates a general block diagram of a communication system 100 capable of operating in accordance with any of the code division multiple access (CDMA) communication system standards while incorporating various embodiments of the invention. Communication system 100 may be for communications of voice, data or both. Generally, communication system 100 includes a base station 101 that provides communication links between a number of mobile stations, such as mobile stations 102–104, and between the mobile stations 102–104 and a public switch telephone and data network 105. The mobile stations in FIG. 1 may be referred to as data access terminals (AT) and the base station as data access network (AN) without departing from the main scope and various advantages of the invention. Base station 101 may include a number of components, such as a base station controller and a base transceiver system. For simplicity, such components are not shown. Base station 101 may be in communication with other base stations, for example base station 160. A mobile switching center (not shown) may control various operating aspects of the communication system 100 and in relation to a back-haul 199 between network 105 and base stations 101 and 160.

Base station 101 communicates with each mobile station that is in its coverage area via a forward link signal transmitted from base station 101. The forward link signals targeted for mobile stations 102–104 may be summed to form a forward link signal 106. Each of the mobile stations 102–104 receiving forward link signal 106 decodes the forward link signal 106 to extract the information that is targeted for its user. Base station 160 may also communicate with the mobile stations that are in its coverage area via a forward link signal transmitted from base station 160. Mobile stations 102–104 communicate with base stations 101 and 160 via corresponding reverse links. Each reverse link is maintained by a reverse link signal, such as reverse link signals 107–109 for respectively mobile stations 102–104. The reverse link signals 107–109, although may be targeted for one base station, may be received at other base stations.

Base stations 101 and 160 may be simultaneously communicating to a common mobile station. For example, mobile station 102 may be in close proximity of base stations 101 and 160, which can maintain communications with both base stations 101 and 160. On the forward link, base station 101 transmits on forward link signal 106, and base station 160 on the forward link signal 161. On the reverse link, mobile station 102 transmits on reverse link signal 107 to be received by both base stations 1 01 and 160. For transmitting a packet of data to mobile station 102, one of the base stations 101 and 160 may be selected to transmit the packet of data to mobile station 102. On the reverse link, both base stations 101 and 160 may attempt to decode the traffic data transmission from the mobile station 102. The data rate and power level of the reverse and forward links may be maintained in accordance with the channel condition between the base station and the mobile station. The reverse link channel condition may not be the same as the forward link channel condition. The data rate and power level of the reverse link and forward link may be different. One ordinary skilled in the art may recognize that the amount of data communicated in a period of time varies in accordance with the communication data rate. A receiver may receive more data at high data rate than low data rate during the same period of time. Moreover, the rate of communications between the users may also change. A receiver may receive more data at high rate of communications than low rate of communications during the same period of time.

Figure 2:
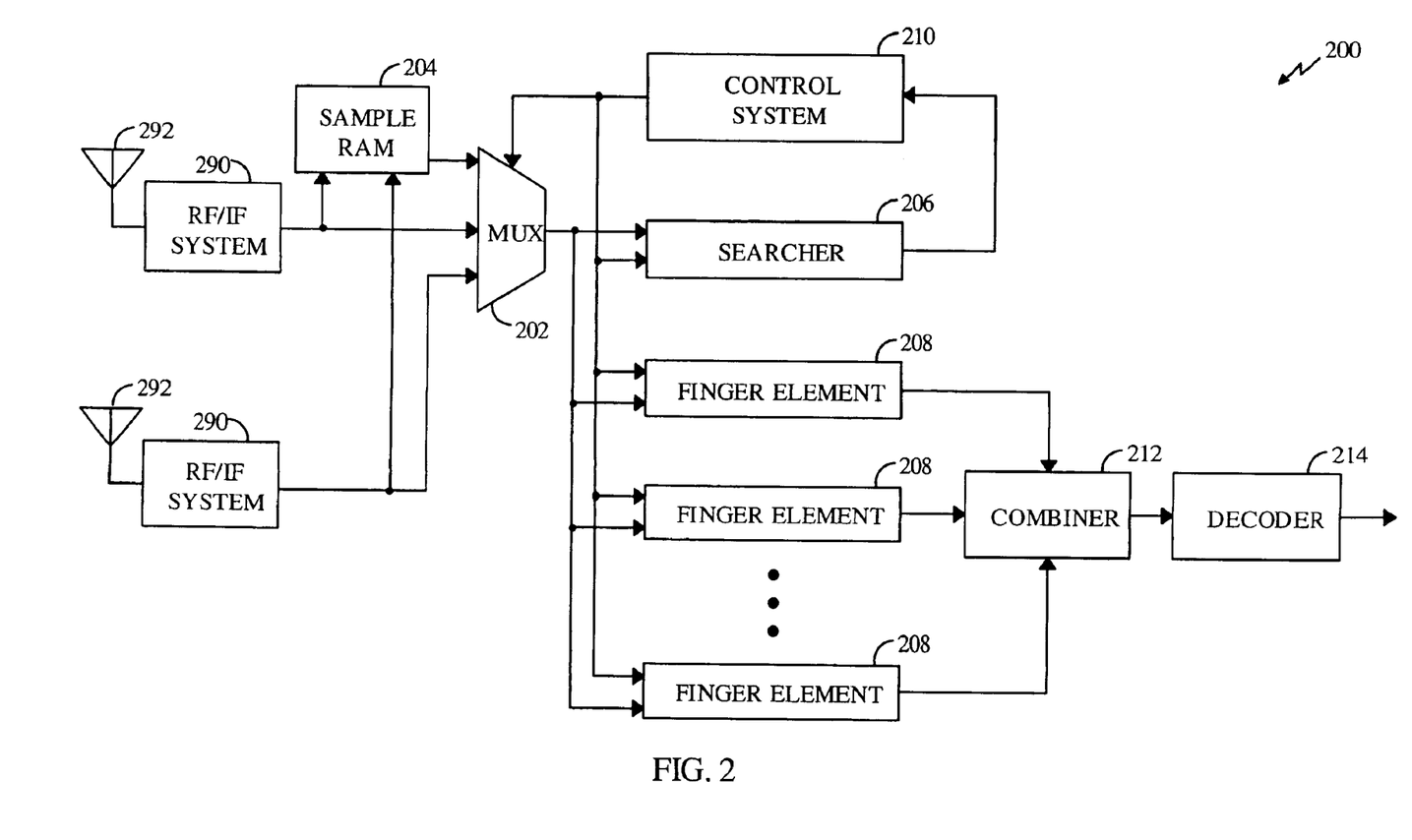
FIG. 2 illustrates a communication system receiver for receiving and decoding received packets of data while operating in accordance with various aspects of the invention.

FIG. 2 illustrates a block diagram of a receiver 200 used for processing and demodulating the received CDMA signal while operating in accordance with various aspects of the invention. Receiver 200 may be used for decoding the information on the reverse and forward links signals. Received (Rx) samples may be stored in RAM 204. Receive samples are generated by a radio frequency/intermediate frequency (RF/IF) system 290 and an antenna system 292. The RE/IF system 290 and antenna system 292 may include one or more components for receiving multiple signals and RF/IF processing of the received signals for taking advantage of the receive diversity gain. Multiple received signals propagated through different propagation paths may be from a common source. Antenna system 292 receives the RF signals, and passes the RF signals to RF/IF system 290. RF/IF system 290 may be any conventional RF/IF receiver. The received RF signals are filtered, down-converted and digitized to form RX samples at base band frequencies. The samples are supplied to a multiplexer (MUX) 202. The output of MUX 202 is supplied to a searcher unit 206 and finger elements 208. A control unit 210 is coupled thereto. A combiner 212 couples a decoder 214 to finger elements 208. Control unit 210 may be a microprocessor controlled by software, and may be located on the same integrated circuit or on a separate integrated circuit. The decoding function in decoder 214 may be in accordance with a turbo decoder or any other suitable decoding algorithms.

During operation, received samples are supplied to MUX 202. MUX 202 supplies the samples to searcher unit 206 and finger elements 208. Control unit 210 configures finger elements 208 to perform demodulation and despreading of the received signal at different time offsets based on search results from searcher unit 206. The results of the demodulation are combined and passed to decoder 214. Decoder 214 decodes the data and outputs the decoded data. Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art. Receiver 200 may be used in a receiver portion of base stations 101 and 160 for processing the received reverse link signals from the mobile stations, and in a receiver portion of any of the mobile stations for processing the received forward link signals.

Figure 3:
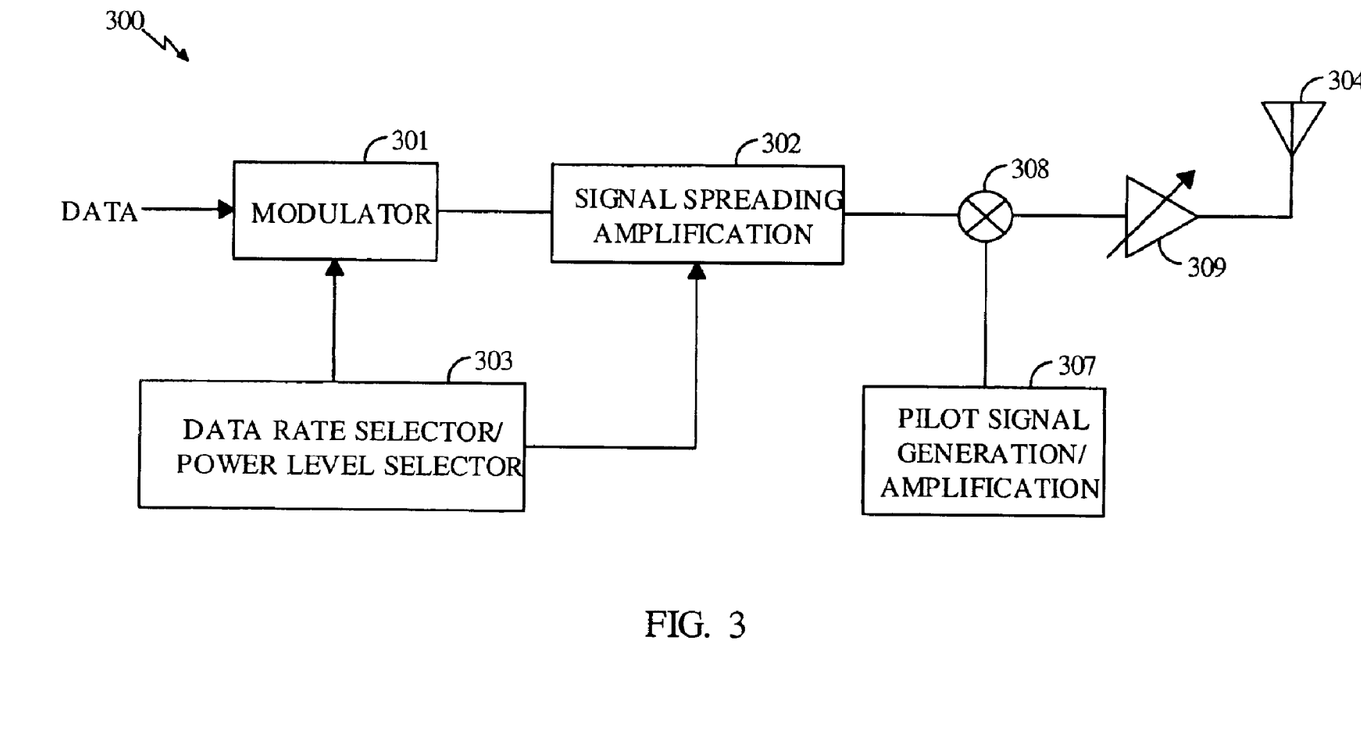
FIG. 3 illustrates a communication system transmitter for transmitting data packets while operating in accordance with various aspects of the invention.

FIG. 3 illustrates a block diagram of a transmitter 300 for transmitting the reverse and forward link signals. The channel data for transmission are input to a modulator 301 for modulation. The modulation may be according to any of the commonly known modulation techniques such as QAM, PSK or BPSK. The data is encoded at a data rate in modulator 301. The data rate may be selected by a data rate and power level selector 303. The data rate selection may be based on feedback information received from a receiving destination. The receiving destination may be a mobile station or a base station. The feedback information may include the maximum allowed data rate. The maximum allowed data rate may be determined in accordance with various commonly known algorithms. The maximum allowed data rate very often is based on the channel condition, among other considered factors. The channel condition may change from time to time. As a result, the selected data rate also changes from time to time accordingly. If the channel condition is not favorable at all, the transmission may not take place until the channel condition changes to a favorable level. As a result, the rate of communications may depend on the channel condition. Therefore, the amount of data communicated over a time period may depend on the channel condition.

The data rate and power level selector 303 accordingly selects the data rate in modulator 301. The output of modulator 301 passes through a signal spreading operation and amplified in a block 302 for transmission from an antenna 304. The data rate and power level selector 303 also selects a power level for the amplification level of the transmitted signal in accordance with the feedback information. The combination of the selected data rate and the power level allows proper decoding of the transmitted data at the receiving destination. A pilot signal is also generated in a block 307. The pilot signal is amplified to an appropriate level in block 307. The pilot signal power level may be in accordance with the channel condition at the receiving destination. The pilot signal may be combined with the channel signal in a combiner 308. The combined signal may be amplified in an amplifier 309 and transmitted from antenna 304. The antenna 304 may be in any number of combinations including antenna arrays and multiple input multiple output (MIMO) configurations.

Figure 4:
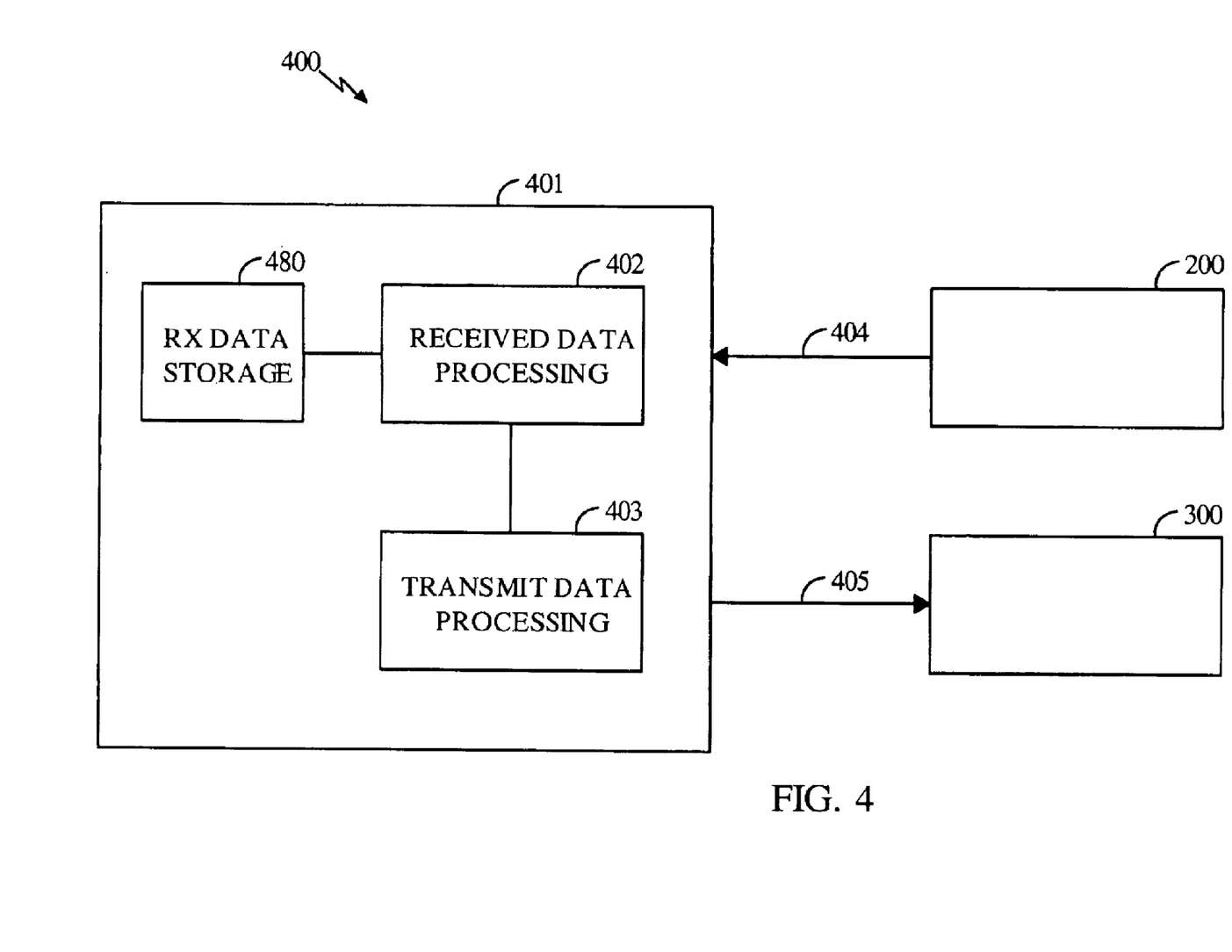
FIG. 4 illustrates a transceiver system capable of operating in accordance with various embodiments of the invention.

FIG. 4 depicts a general diagram of a transceiver system 400 for incorporating receiver 200 and transmitter 300 for maintaining a communication link with a destination. The transceiver 400 may be incorporated in a mobile station or a base station. A processor 401 may be coupled to receiver 200 and transmitter 300 to process the received and transmitted data. Various aspects of the receiver 200 and transmitter 300 may be common, even though receiver 200 and transmitter 300 are shown separately. In one aspect, receiver 200 and transmitter 300 may share a common local oscillator and a common antenna system for RF/IF receiving and transmitting. Transmitter 300 receives the data for transmission on input 405. Transmit data processing block 403 prepares the data for transmission on a transmit channel. Received data, after being decoded in decoder 214, are received at processor 401 at an input 404. Received data are processed in received data processing block 402 in processor 401. Various operations of processor 401 may be integrated in a single or multiple processing units. The transceiver 400 may be connected to another device. The transceiver 400 may be an integral part of the device. The device may be a computer or operate similar to a computer. The device may be connected to a data network, such as the Internet. In case of incorporating the transceiver 400 in a base station, the base station through several connections may be connected to a network, such as the Internet.

The processing of the received data generally includes checking for error in the received packets of data. For example, if a received packet of data has error at an unacceptable level, the received data processing block 402 sends an instruction to transmit data processing block 403 for making a request for retransmission of the packet of data. The request is transmitted on a transmit channel. The receive data storage unit 480 may be utilized to store the received packets of data. The received packets of data may be collected to form a group of packets of data. The group of received packets of data may be passed up or down to another communication protocol layer as a part of maintaining communication between two end points. One of ordinary skill in the art may recognize that the amount of data communicated in a period of time varies in accordance with the communication data rate and the rate of communications. A receiver may receive more data at a high data rate or a high rate of communications than a low data rate or a low rate of communications. A higher level protocol without knowing the communication data rate or the rate of communications at a lower protocol layer may determine an expected delay for receiving an acknowledgment message after sending the data. The expected delay may be based on the history of delays of receiving the previous acknowledgment messages. Since the data rate and the rate of communications at the lower protocol layer may vary, the delay for the acknowledgment message may arrive with less delay at a high data rate and a high rate of communications than a low data rate and a low rate of communications. The higher layer protocol may determine the expected delay during the high data rate communication or high rate of communications. If the communication data rate or rate of communications is changed to a lower rate, the acknowledgment message may not arrive within the expected delay time. When the acknowledgment message has not arrived within the expected delay time, the higher protocol layer in the sender may initiate spurious retransmission of the data packet while the original copy of the data packet has either been received already or is on its way to the receiver. The data packet at a higher protocol layer is comprised of several smaller data packets of the lower layer protocol. As such, it is possible that while the lower layer protocol is attempting to recover one of the segments of the upper layer protocol, the upper layer protocol may time-out (based on the expected delay time) and re-transmit the entire upper layer packet. This results in inefficient use of the communication resources. In accordance with various aspects of the invention, the delay of receiving an acknowledgment message for a high level protocol layer may be controlled by delaying the delivery of the packets to the upper layer of the destination in order to increase the variance of the delay seen by the upper layer protocol at the source (the delay here is referred to the time interval between sending the upper layer packet and the time that the acknowledgment is received). Assuming that the upper layer protocol uses both the mean and the variance of the delays for computation of the re-transmission timeout value, this scheme can prevent spurious re-transmissions by the upper layer.

Figure 5:
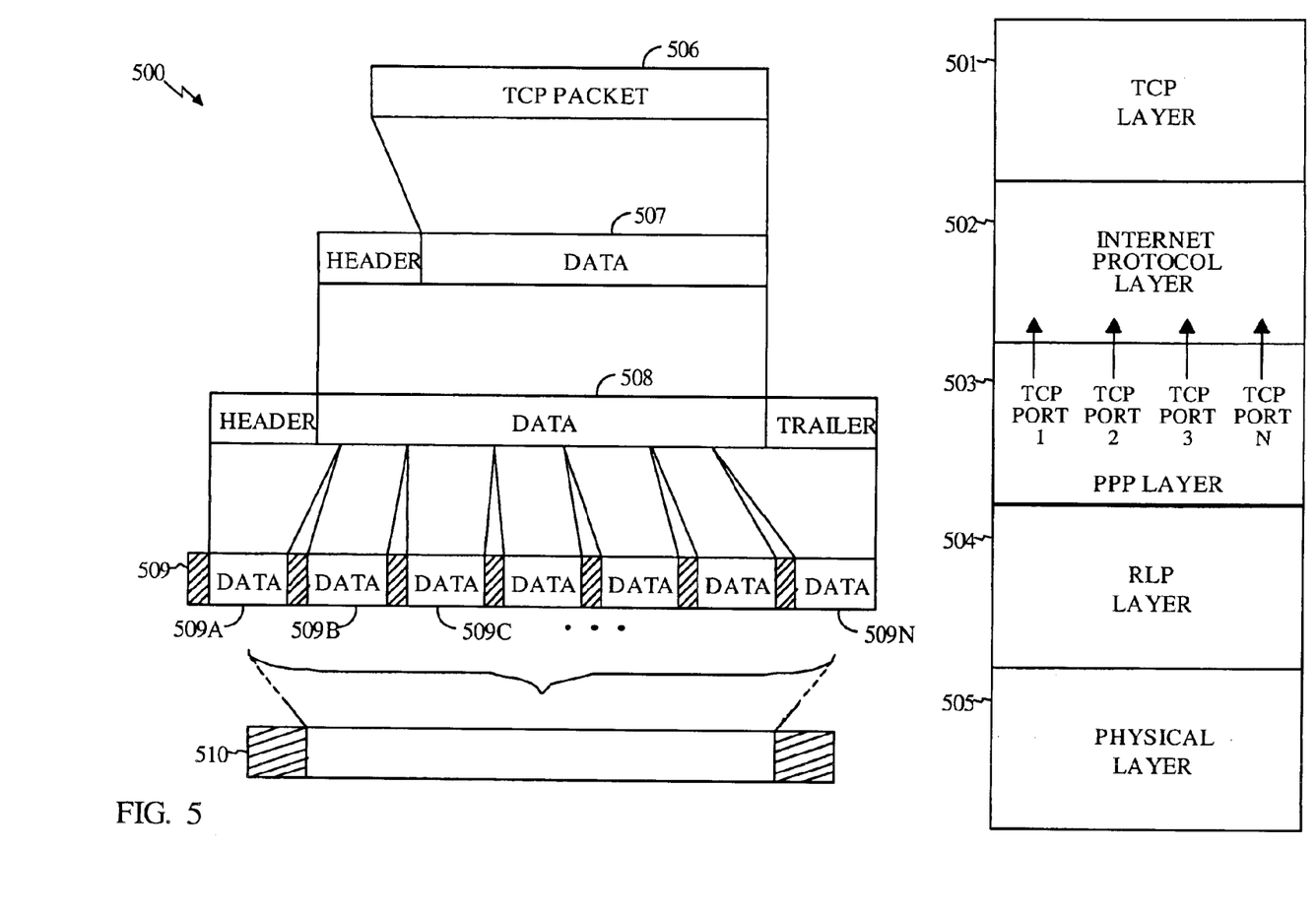
FIG. 5 illustrates a stack of protocol layers for controlling flow of data in a communication system.

The flow of data between two end points may be controlled via several protocol layers. An exemplary stack of the protocol layers 500 is shown in FIG. 5 for controlling the flow of data between two end points. For example, one end point may be a source connected to the Internet through the network 105. The other end point may be a data processing unit such as a computer coupled to a mobile station or integrated in a mobile station. The protocol layers 500 may have several other layers or each layer may have several sub-layers. A detailed stack of protocol layers is not shown for simplicity. The stack of protocol layers 500 may be followed for flow of data in a data connection from one end point to another. At the top layer, a TCP (Transmission Control Protocol) layer 501 controls the TCP packets 506. TCP packets 506 may be generated from a much larger data file. The data file may be partitioned into several TCP packets 506. The data file may include text message data, video data, picture data or voice data. The size of the TCP packets 506 may be different at different times. At the Internet Protocol (IP) layer 502, a header is added to the TCP packets 506 to produce data packet 507. The header may identify a port number for proper routing of the packets of data to the appropriate application. At a point-to-point protocol (PPP) layer 503, PPP header and trailer data are added to data packet 507 to produce data packet 508. The PPP data may identify the point-to-point connection addresses for proper routing of a packet of data from a source connection point to a destination connection point. The PPP layer 503 may pass data to TCP layer protocol 501 connected to different ports. Each port may be a source of a TCP file. The port identifier may identify the routing of the packets to the TCP layer protocol 501. A radio link protocol (RIP) layer 504 provides a mechanism for retransmission and duplication of data packets. At RLP layer 504, the data packet 508 is divided into several RLP packets 509A-N. Each of the REP packets 509A-N is processed independently and assigned a sequence number. The sequence number is added to the data in each REP packet of data for identifying the RLP packet of data among the REP packets 509A-N. One or more of the REP packets 509A-N is placed into a physical layer packet of data 510. The size of the payload of the packet of data 510 may vary from time to time. A physical layer 505 controls the channel structure, frequency, power output, and modulation specification for data packet 510. The data packet 510 is transmitted to a destination. The size of data packet 510 may be different from time to time based on the channel condition and the selected communication data rate.

On a receiving destination, the data packet 510 is received and processed. The received packet 510 is passed on to RLP layer 504. The RLP layer 504 attempts to reconstruct the RLP packets 509A-N from the received packets of data. In order to reduce the packet error rate seen by the higher layer of protocol, the RLP layer 504 implements an automatic retransmission request (ARQ) mechanism by requesting re-transmission for the missing RLP packets. The RLP protocol re-assembles packets 509A-N to form a complete packet 508. The process may take some time to completely receive all the RLP packets 509A-N. Several transmissions of data packet 510 may be needed to completely send all the RLP packets 509A-N. When an RLP packet of data is received out of sequence, the RLP layer 504 sends a negative acknowledgement (NAK) message to the transmitting destination. In response, the transmitting destination retransmits the missing RLP data packet.

The processing of the received data in the transceiver 400 generally includes checking for error in the received packets of data. For example, if a received packet of data has error at an unacceptable level, the received data processing block 402 sends an instruction to transmit data processing block 403 for making a request for retransmission of the packet of data. The request is transmitted on a transmit channel. The receive data storage unit 480 may be utilized to store the correctly received packets of data. The correctly received packets of data may be collected to form a group of packets of data. The group of received packets of data may be passed up or down to another communication protocol layer.

Figure 6:
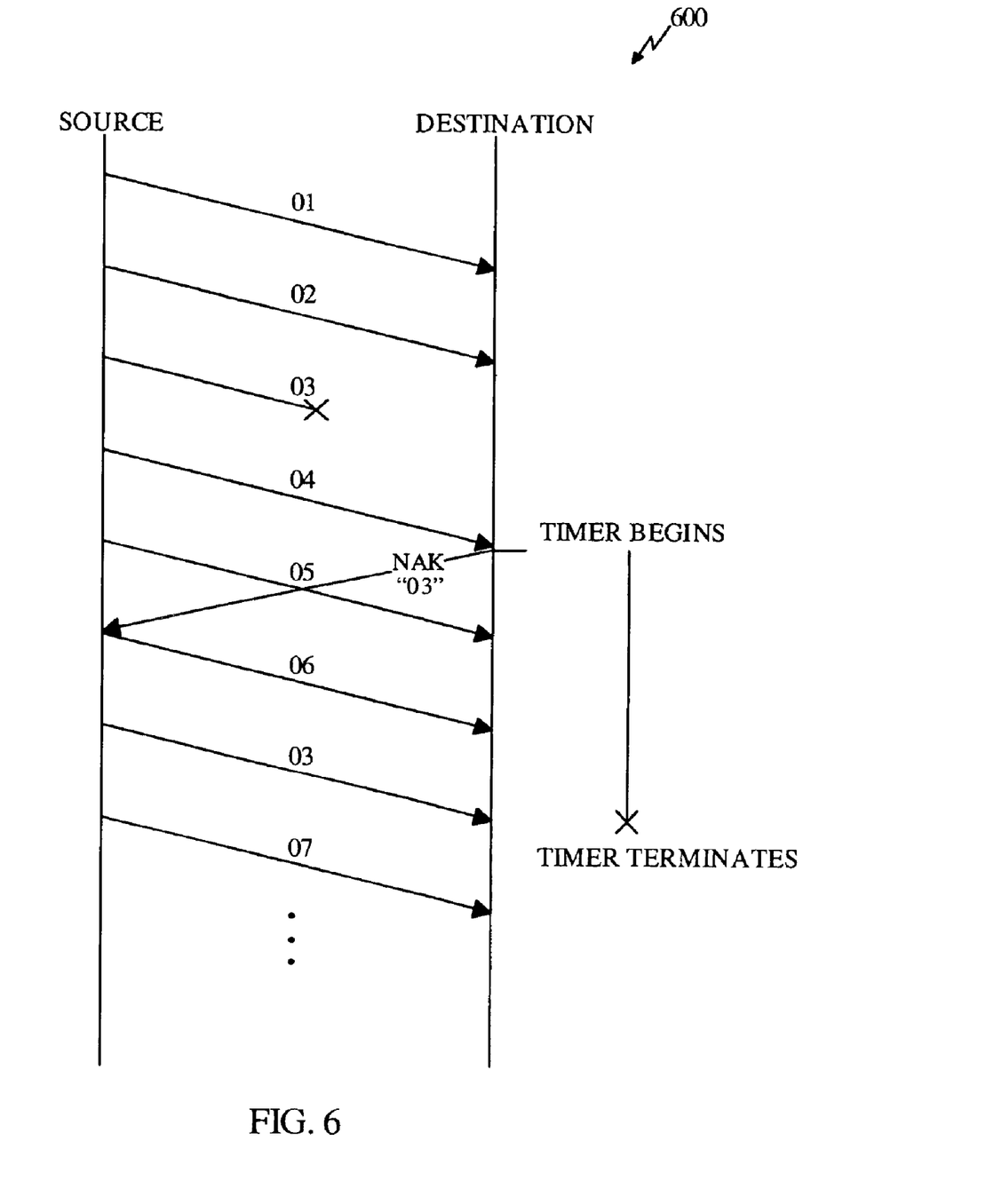
FIG. 6 illustrates a process for retransmission of a missing packet of data.
Figure 7:
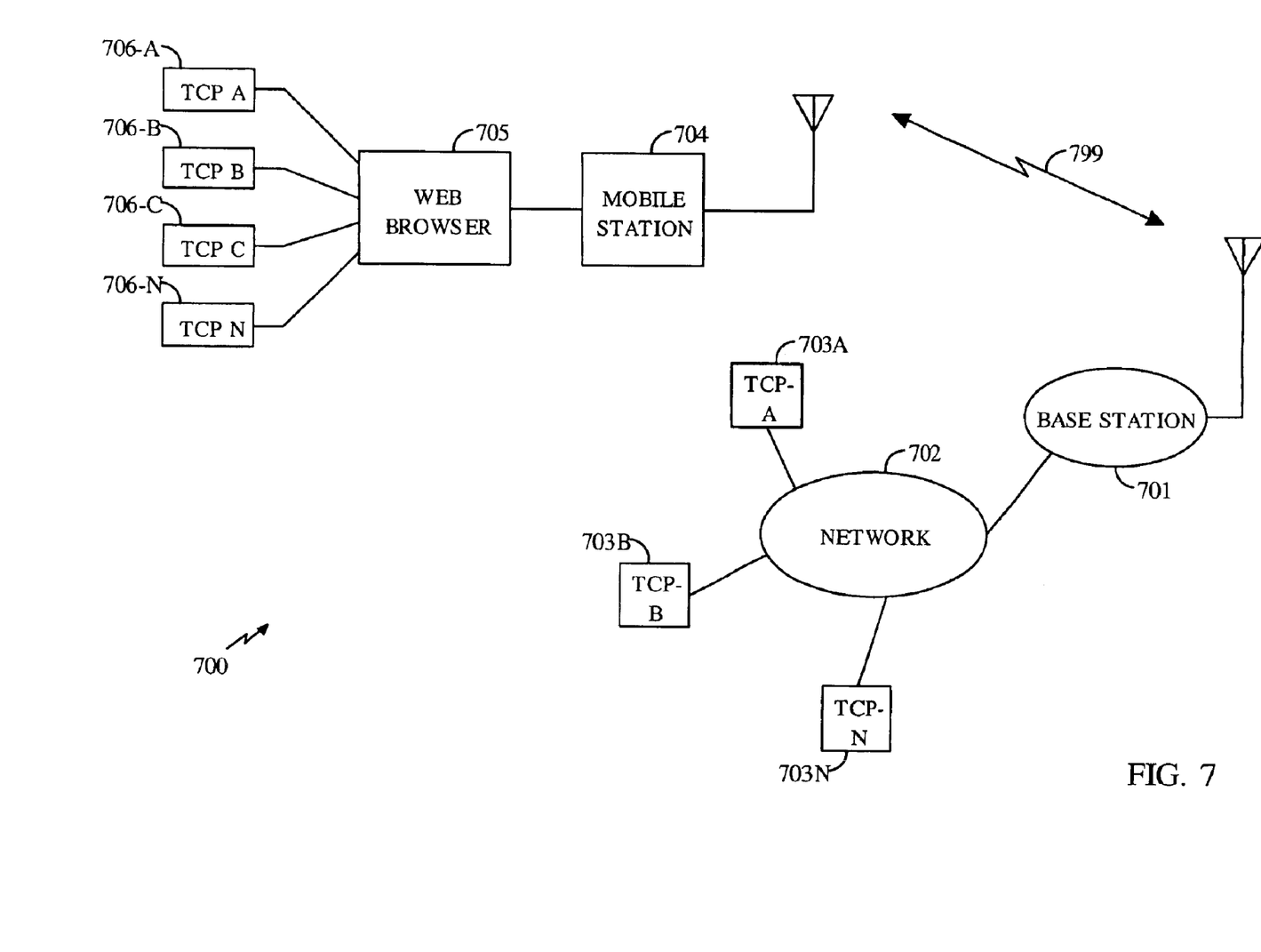
FIG. 7 illustrates a wireless communication system, capable of operating in accordance with various aspects of the invention, for communications of data between a source end and a destination end.

Referring to FIG. 6, a message flow 600 is shown to provide an exemplary flow of data at the physical layer 505. The RLP packets with sequence numbers "01" to "07" are sent from a source to a destination, for example. The source and destination may be, respectively, either a base station and a mobile station or a mobile station and a base station. Briefly, a communication system 700 is shown in FIG. 7 that is capable of wireless communications of data between a source and destination while operating in accordance with various aspects of the invention. A base station 701 and a mobile station 704 may have a wireless communication link 799. A web browser 705 may be incorporated in mobile station 704 for connecting to several TCP layer ports 706A-N. Each TCP port may provide certain types of data or services. Similarly, a network 702 may be connected to base station 701. The network 702 may be connected to a number of TCP layer ports 703A-N for, possibly, providing certain types of data or services. Therefore, the data passed up or down through the PPP layer 503 may include data for different TCP layers at different ports.

At the RLP layer 504, the RLP packets 509A-N are accumulated to complete the packet 508. Once all the RLP packets 509A-N are received, the RLP packets 509A-N are passed on to a higher level. One or more RLP packets 509 may be combined into a common payload and sent on one data packet 510. In the exemplary message flow 600, the RLP packet identified as RLP packet "03," for example does not get to the destination. The failure may be due to many factors including disruption of the radio link between the source and the destination. After the destination receives RLP packet "04," the RLP layer 504 detects an out of sequence reception of the RLP packets. The RLP layer 504 sends a NAK message identifying RLP packet "03" as missing in the communication. At the same time RLP layer 504 begins a timer. The timer counts the lapsed amount of time after sending the NAK message. If the timer expires, for example after 500 mSec, before receiving the missing RLP packet "03," the destination RLP 504 may assume that the retransmission of the missing packet has failed, and the destination RLP may deliver to the upper layer the RLP packets that have been received in sequence up to the next missing RLP packet. If there is no other missing RLP packet, the RLP may deliver all the received in-sequence packets. In such a case, the system relies on a similar ARQ mechanism maintained by an upper layer protocol layer. The source may limit the number of retransmission of an RLP packet only to one time. Therefore, in such a situation, sending another NAK message may not help because the source may have retransmitted the missing RLP packet "03" without being received at the destination. Once the missing RLP packet "03" is received, the timer terminates. The correctly received packets of data may be collected in storage unit 480 to form a group of packets of data.

The TCP layer 501 also has a similar retransmission process. If the TCP layer 501 at the transmitting source does not receive an expected acknowledgment message of proper reception of TCP packet 506 at the destination for some time, the TCP layer 501 at the transmitting source re-transmits the TCP packet. The TCP layer 501 determines a delay period for receiving an acknowledgment message for indicating proper reception of the packet at the destination. If the acknowledgment message does not arrive within the expected delay, the TCP packet will be retransmitted. The TCP layer 501 may be connected to many different devices and networks. The TCP layer 501 determines a delay period based on the past successful transmissions. In accordance with various aspects of the invention, a lower protocol layer may randomly delay propagation of some of the lower layer packets in order to increase the variance in the delay seen by the TCP layer. Since TCP uses the variance of the delay in determining the timeout value (used for re-transmission), the increase in variance causes an increase in the timeout value and, therefore, prevents most of the spurious TCP re-transmissions. The communication at the RLP layer and physical layer may be over a high data rate or high rate of communications for some time, and drop to a low data rate or low rate of communications in rapid succession. The TCP expected delay of the acknowledgment message may not be sufficient for the changes in the communication. As a result, the expected delay may correspond to a high data rate or a high rate of communications. When the data rate is lowered or the rate of communications is reduced, the acknowledgment message may not get to the TCP layer 501 within the expected delay period. The TCP layer, since it does not have any information about the state of communications at the lower protocol layers, may request retransmission of a TCP data packet, resulting in inefficient use of the communication resources. In accordance with various aspects of the invention, the delay of the TCP acknowledgment message is controlled to allow the TCP layer 501 to experience a stable rate of delay of the TCP acknowledgment message communications. Therefore, the TCP layer 501 may determine an expected delay period that is consistent with a steady flow of communications at higher level protocol. Even though the rate of communications or data rate at the lower protocol layer may change from time to time, possibly, in a rapid succession, the expected delay for receiving TCP acknowledgment message at the TCP layer 501 remains steady, in comparison.

Figure 8:
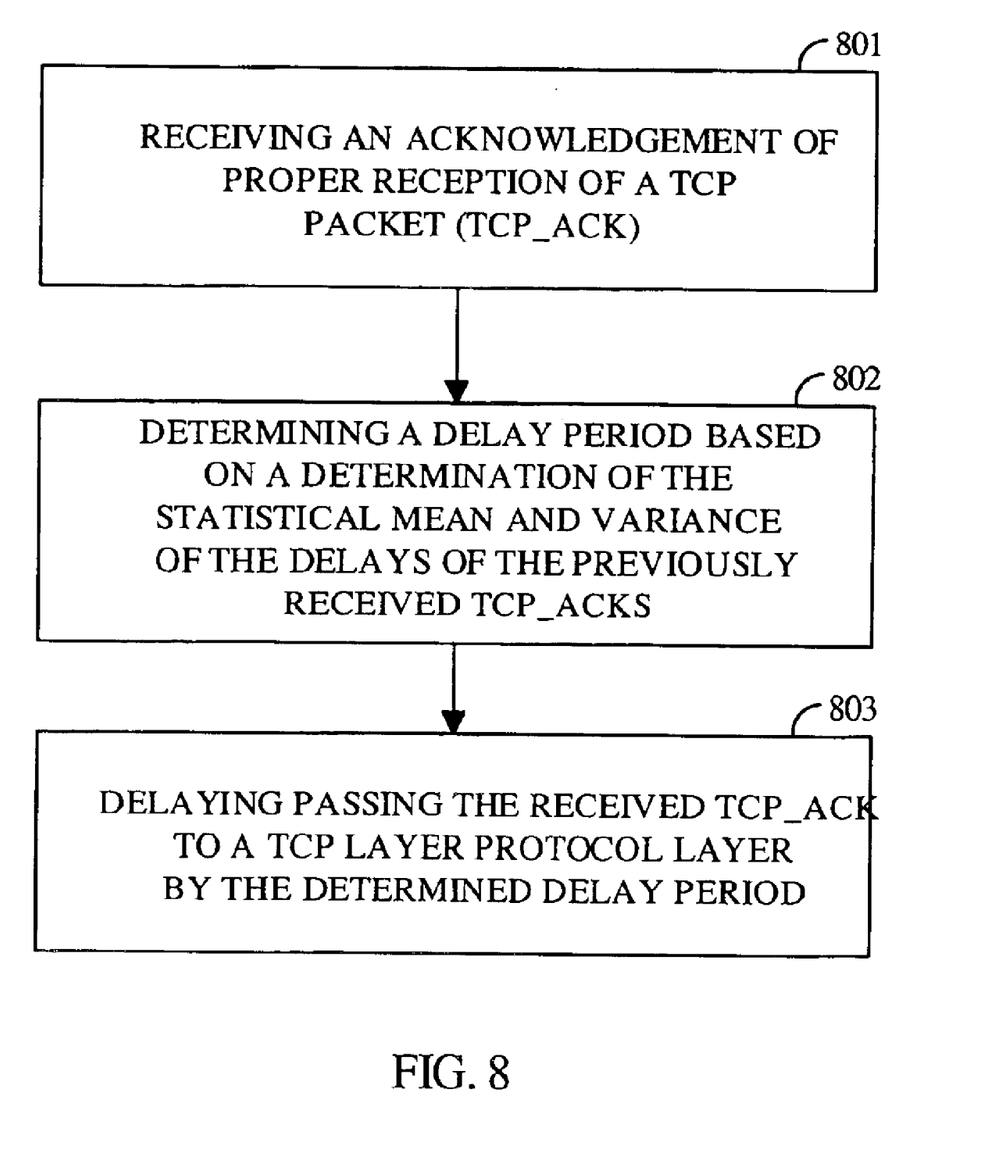
FIG. 8 illustrates various steps for controlling flow of data packets in a communication system in accordance with various aspects of the invention.

Referring to FIG. 8, a flow chart for delaying TCP acknowledgment message in a communication system, such as communication system 100, is shown in accordance with various aspects of the invention. At step 801, an acknowledgment message for proper reception of a TCP packet is received. Such a TCP acknowledgment message may be received at the RLP protocol layer 504 or PPP layer 503. The receiver 200 may process the TCP acknowledgment message. Control system 210 or processor 401 may determine that the message is a TCP acknowledgment message. Various ways are possible for determining that the received message is a TCP acknowledgment message. For example, the received TCP acknowledgment message may carry a unique identifying header. The control system 210 or processor 401, at step 802, may determine a delay period based on a determination of the statistical mean and variance of the delays of the previously received TCP acknowledgment messages. At step 803, the control system 210 or processor 401 may delay passing the received TCP acknowledgment message to the TCP layer 501 by the determined delay period. As a result, the TCP layer 501 may receive the TCP acknowledgment message within a controlled statistical means and variance of delay. As such, the TCP layer 501 may determine an expected delay that is consistent and independent of various changes in the system communication parameters. A TCP retransmission may take place if the acknowledgment message is not received within the determined expected delay. The expected delay becomes independent of various changes in rate of communications or data rate at lower level. The determined expected delay by the TCP layer 501 is, therefore, controlled at the lower level protocols.

Various components of the communication system 100 may control various aspects of the stack of protocol layers 500. The RLP layer 504 and physical layer 505 may be controlled by processor 401 through operations of the received and transmit data processing units 402 and 403. Therefore, processor 401 or control system 210 may be able to control the behavior at the TCP layer 501 to prevent TCP layer 501 from making a request for retransmission of a TCP packet 506 when the rate of communications or data rate of the communications changes from a high rate to a low rate in a quick succession. The TCP expected delay of the acknowledgment message may be shorter than a period that is needed for receiving the message during low rate of communications and low data rate of communications. Processor 401 and control system 210 control delay of the TCP acknowledgment message in a manner that the expected delay determined by the TCP layer 501 becomes independent of the changes at the lower protocol layers. Therefore, in accordance with various aspects of invention, the correctly received TCP acknowledgment messages may be delayed by a controlled amount at the lower protocol layer by storing the message in storage unit 480 for a period of time before being passed up to a higher communication protocol layer.

Figure 9:
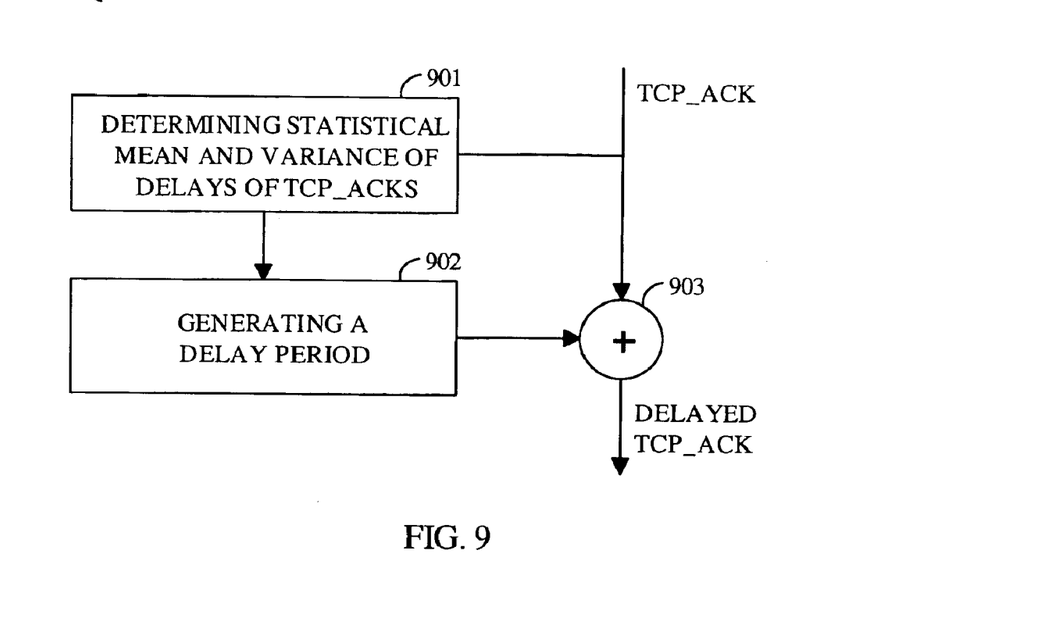
FIG. 9 illustrates a system for controlling flow of data packets between a source end and a destination end in accordance with various aspects of the invention.

Referring to FIG. 9, a block diagram of a control system 900 for delaying the TCP acknowledgment message is shown in accordance with various embodiments of the invention. At block 901, the control system 210 or processor 401 may determine the statistical variance of delay of the previously received TCP acknowledgment messages. At block 902, a delay period is generated based on the determined statistical variance and statistical mean of the delay. At block 903, the received TCP acknowledgment message is delayed by the generated delay period. The process of delaying the message may be through storing the message in memory unit 480 for the duration of the delay period before the message is passed up to the higher protocol layer.

Figure 10:
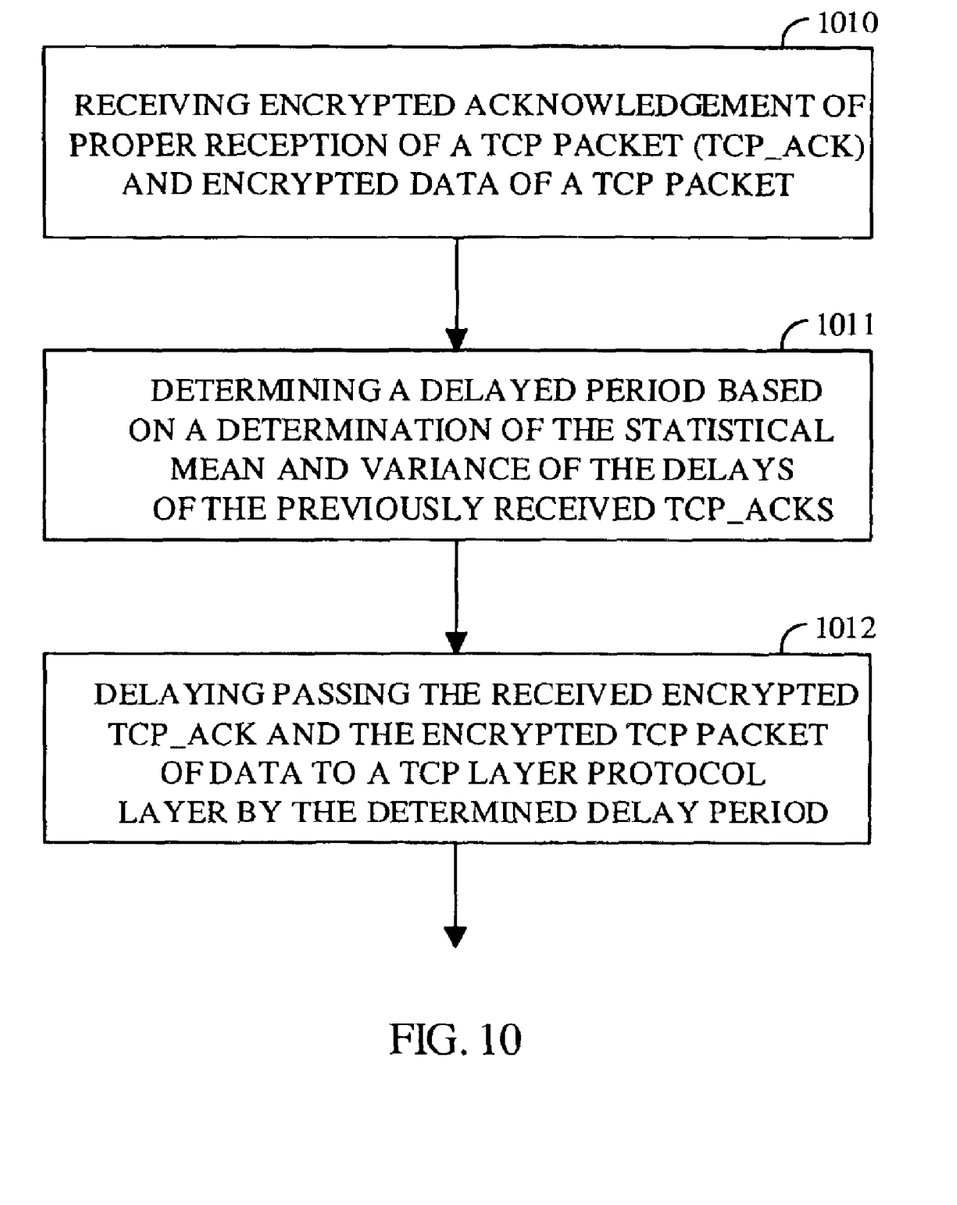
FIG. 10 illustrates various steps for controlling flow of encrypted data packets in a communication system in accordance with various aspects of the invention.

The communications between two end users may be encrypted. The physical protocol layer 505, RLP layer 504 and PPP layer 503 may not have the capacity to distinguish which received data packet includes the TCP acknowledgment message. The TCP acknowledgement message and other data may be encrypted. Referring to FIG. 10, in accordance with various embodiments of the invention, steps 1010–12 may be performed to produce a delay in TCP acknowledgment message. At step 1010, the encrypted TCP acknowledgment message and encrypted data are received. At step 1011, a delay period is determined based on the statistical variance and statistical mean of the delay of the previously received TCP acknowledgment messages. At step 1012, the encrypted TCP acknowledgment message and the encrypted data are delayed for a period of time corresponding to the determined delay period. As a result, the TCP layer 501 may determine the expected delay of the TCP acknowledgment message based on the added delay.

Figure 11:
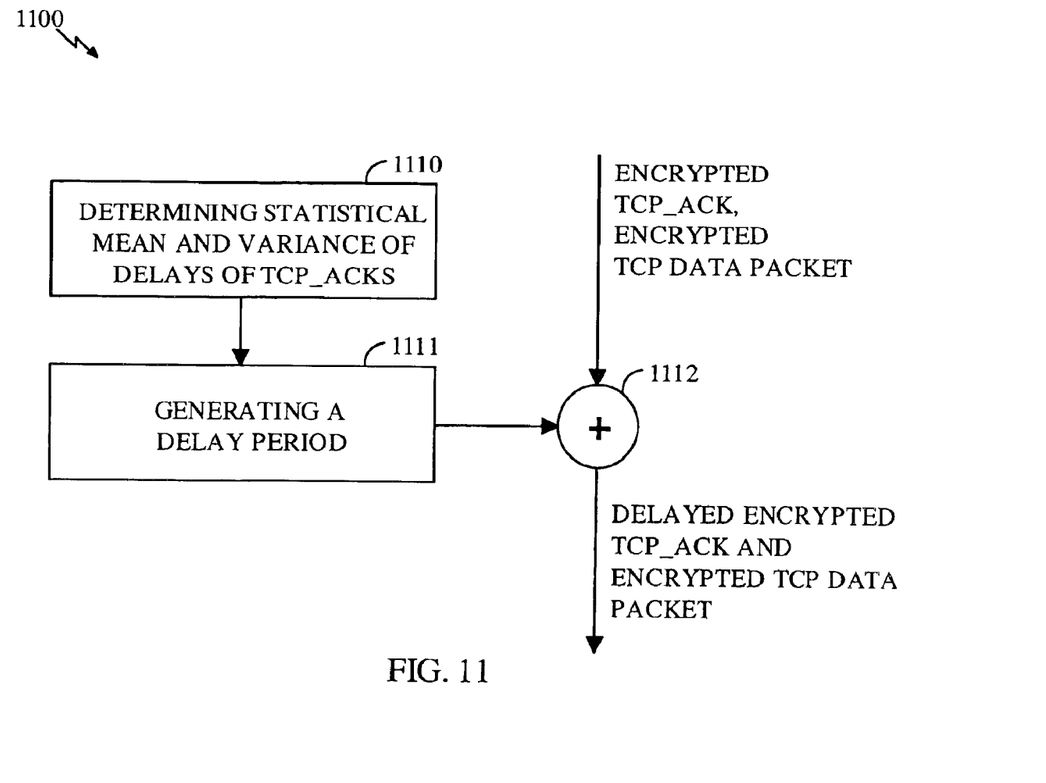
FIG. 11 illustrates a system for controlling flow of encrypted data packets between a source and destination in accordance with various aspects of the invention.

Referring to FIG. 11, a block diagram of a control system 1100 for delaying the encrypted TCP acknowledgment message is shown in accordance with various embodiments of the invention. At block 1110, the control system 210 or processor 401 may determine the statistical variance of delay of the previously received TCP acknowledgment messages. At block 1111, a delay period is generated based on the determined statistical variance and statistical mean of the delay. At block 1112, the received encrypted TCP acknowledgment message and the received encrypted data are delayed by the generated delay period. The process of delaying the encrypted TCP acknowledgment message and the encrypted data may be by storing all the received data in a memory unit 480 for the duration of the delay period before the encrypted TCP acknowledgment message and the encrypted data are passed up to the higher protocol layer. Even though, the processor 401 has no direct control over the process at TCP layer 501, by incorporating various steps of the invention, an unnecessary retransmission of TCP packet 506 may be prevented.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method comprising:
   receiving an acknowledgment message which indicates reception of a packet of data at a destination;
   determining a statistical mean and variance of delays of a plurality of previously received acknowledgment messages associated with a corresponding plurality of transmitted packets of data, wherein each delay is a time interval between transmitting a packet of data and receiving an acknowledgment;
   determining a delay period based on said statistical mean and variance of delays; and
   delaying passing said received acknowledgment message from a first protocol layer to a second protocol layer by said determined delay period.

2. The method as recited in claim 1 wherein said second protocol layer is a TCP protocol layer.

3. A data processing unit comprising:
   an input for receiving an acknowledgment message which indicates reception of a packet of data at a destination;
   a processing unit for determining a statistical mean and variance of delays of a plurality of previously received acknowledgment messages associated with a corresponding plurality of transmitted packets of data, wherein each delay is a time interval between transmitting a packet of data and receiving an acknowledgment, and for determining a delay period based on said statistical mean and variance of delays; and
   a data storage unit for delaying passing said received acknowledgment message from a first protocol layer to a second protocol layer by said determined delay period.

4. The data processing unit as recited in claim 3 wherein said second protocol layer is a TCP protocol layer.

5. The data processing unit as recited in claim 3 wherein said destination is a mobile station in a communication system.

6. A method comprising:
   receiving an encrypted acknowledgment message which indicates reception of a packet of data at a destination, wherein said encrypted acknowledgment message is combined with encrypted data;
   determining a statistical mean and variance of delays of a plurality of previously received acknowledgment messages associated with a corresponding plurality of transmitted packets of data, wherein each delay is a time interval between transmitting a packet of data and receiving an acknowledgment;
   determining a delay period based on said statistical mean and variance of delays; and
   delaying passing said received encrypted acknowledgment message and encrypted data from a first protocol layer to a second protocol layer by said determined delay period.

7. The method as recited in claim 6 wherein said second protocol layer is a TCP protocol layer.

8. A data processing unit, comprising:
   an input for receiving an encrypted acknowledgment message which indicates reception of a packet of data at a destination, wherein said encrypted acknowledgment message is combined with encrypted data;
   a processing unit for determining a statistical mean and variance of delays of a plurality of previously received acknowledgment messages associated with a corresponding plurality of transmitted packets of data, wherein each delay is a time interval between transmitting a packet of data and receiving an acknowledgment, and for determining a delay period based on said statistical mean and variance of delays; and
   a data storage unit for delaying passing said received encrypted acknowledgment message and said encrypted data from a first protocol layer to a second protocol layer by said determined delay period.

9. The data processing unit as recited in claim 8 wherein said second protocol layer is a TCP protocol layer.

10. The data processing unit as recited in claim 8 wherein said destination is a mobile station in a communication system 3.

11. A system for communications of data, comprising:
a base station for communicating radio link protocol (RLP) packets of data over a physical layer protocol and processing an acknowledgment message which indicates reception of a Transmission Control Protocol (TCP) packet of data at a destination, wherein said TCP packet of data comprises one or more said RLP packets of data;
a processor coupled to said base station for passing the acknowledgment message from a lower protocol layer to a TCP protocol layer, determining a statistical mean and variance of delays of a plurality of acknowledgment messages associated with a corresponding plurality of transmitted TCP packets of data, wherein each delay is a time interval between transmitting a TCP packet of data and receiving an acknowledgment, determining a delay period based on said statistical mean and variance of delays, delaying passing said received acknowledgment message from the lower protocol layer to the TCP protocol layer by said determined delay period; and
a network communicatively coupled to said base station for routing said TCP packets of data to the destination.

12. The system as recited in claim 11 wherein said destination is a mobile station.

13. A system for communications of data, comprising:
a base station for communicating radio link protocol (RLP) packets of data over a physical layer protocol and processing an encrypted acknowledgment message which indicates reception of a Transmission Control Protocol (TCP) packet of data at a destination, wherein said TCP packet of data comprises one or more said RLP packets of data, and said encrypted acknowledgment message is combined with encrypted data;
a processor coupled to said base station for passing the encrypted acknowledgment message and encrypted data from a lower protocol layer to a TCP protocol layer, determining a statistical mean and variance of delays of a plurality of acknowledgment messages associated with a corresponding plurality of transmitted TCP packets of data, wherein each delay is a time interval between transmitting a TCP packet of data and receiving an acknowledgment, determining a delay period based on said statistical mean and variance of delays, delaying passing said received encrypted acknowledgment message and said encrypted data from the lower protocol layer to the TCP protocol layer by said determined delay period; and
a network communicatively coupled to said base station for routing said TCP packets of data to the destination.

14. The system as recited in claim 13, wherein said destination is a mobile station.

15. An apparatus configured to change a rate of communicating data packets to a destination, the apparatus comprising:
a stack of protocol layers comprising a lower protocol layer and an upper protocol layer, the lower protocol layer being configured to (a) pass a data packet from the upper protocol layer toward the destination, and (b) pass an acknowledgment message to the upper protocol layer, the acknowledgment message indicating the destination properly received the data packet from the upper protocol layer;
the upper protocol layer being configured to (a) determine an expected delay between sending the data packet and receiving the acknowledgment message based on delays of previous acknowledgment messages, and (b) retransmit the data packet if the acknowledgment message has not been received within the expected delay;
wherein the lower protocol layer controls the expected delay;
wherein the expected delay is based on a history of actual delays of acknowledgement messages being received by the upper protocol layer, the apparatus further comprising:
means for determining a delay period using a statistical mean of the actual delay history and a variance of the actual delay history,
wherein the lower protocol layer is configured to delay the propagation of the acknowledgement message to the upper protocol layer substantially by the determined delay period.

16. The apparatus of claim 15, wherein the lower protocol layer comprises a plurality of protocol layers.

17. The apparatus of claim 15, where the upper protocol layer determines the expected delay based on a history of actual delays of acknowledgement messages received by the upper protocol layer, the upper protocol layer being configured to employ a variance of the actual delays to determine the expected delay, wherein the lower protocol layer controls the expected delay by increasing the variance of the actual delays.

18. The apparatus of claim 15, where the upper protocol layer data packet comprises a plurality of lower protocol layer data packets, where the lower protocol layer delays propagation of at least one of the lower protocol layer data packets to the destination.

19. The apparatus of claim 18, where the lower protocol layer is configured to randomly delay propagation of at least one of the lower protocol layer data packets.

20. The apparatus of claim 17, where the upper protocol layer is configured to employ a statistical mean of the actual delays to compute the expected delay.

21. The apparatus of claim 15, where the lower protocol layer delays propagation of the acknowledgement message to the upper protocol layer.

22. The apparatus of claim 21,
where the data packet includes a plurality of data packets,
where the lower protocol layer comprises means for delaying propagation of both the acknowledgement message and at least one of the data packets to the upper protocol layer, and
where the lower protocol layer is configured to delay the propagation of the acknowledgement message and the at least one of the data packets to the upper protocol layer by the determined delay period.

23. The apparatus of claim 15, where the lower protocol layer is a radio link protocol (RLP) layer and the upper protocol layer is a transmission control protocol (TCP) layer.

* * * * *